United States Patent [19]

Owens

[11] 4,425,097

[45] Jan. 10, 1984

[54] APPARATUS FOR TRAINING EQUIPMENT OPERATORS

[76] Inventor: Lawrence L. Owens, 9434 Domer Rd., Santee, Calif. 92071

[21] Appl. No.: 300,360

[22] Filed: Sep. 8, 1981

[51] Int. Cl.³ .................................................. G09B 19/16
[52] U.S. Cl. ..................................... 434/219; 434/66; 434/366
[58] Field of Search ................... 434/219, 366, 29, 62, 434/66

[56] References Cited

U.S. PATENT DOCUMENTS

| 3,318,020 | 5/1967 | Miller et al. | 434/219 |
| 3,456,363 | 7/1969 | Boxley | 434/219 |
| 3,590,265 | 6/1971 | Richardson | 434/66 X |

Primary Examiner—William H. Grieb
Attorney, Agent, or Firm—Ralph S. Branscomb

[57] ABSTRACT

The training aid described herein is used to train operators of equipment, generally heavy mobile equipment, and comprises a briefcase-sized unit having a connector cable within releasably connects to the control systems and indicators on the vehicle, which have been modified in several ways. The control unit in the briefcase is capable of either simulating one or more abnormal conditions in the equipment by overriding normal readings such as on indicators, meters or alarms, or additionally actual abnormal conditions can be created in the equipment by degrading brakes, the retarder system, hydraulic steering mechanism, or actually killing the engine or the propulsive power of the unit. An instructor operates the control unit while sitting alongside a trainee, to put the trainee through a whole range of abnormal conditions, some simulated and some induced, so that in a few hours of training the trainee can experience years of problems and abnormalities in order to enable him to meet these problems better when they do occur in real life.

10 Claims, 10 Drawing Figures

GAUGES-TYPICAL
FIG. 6

APPARATUS FOR TRAINING EQUIPMENT OPERATORS

BACKGROUND OF THE INVENTION

The invention is in the field of safety pertaining to equipment operation generally, and more particularly relates to training operators of mine equipment, specifically heavy mine equipment such as the large haulage trucks used in strip mines, to operate the vehicles more safely.

A study of surface mine injuries occurring in 1973 turned up 24 fatal accidents which were reported for that year. Of this number, half were caused by the truck leaving the roadbed and overturning, or backing over an embankment. Only one of the 24 accidents was classified as one in which operator error was not involved, and the circumstances make even this accident somewhat questionable. In that accident, a stockpile caved in on the truck. The details of the truck positioning and other factors are not known.

A sample of 410 nonfatal injuries disclosed that 85% of the accidents involved operator error as a contributing factor. Although clearly it cannot always be known whether a particular accident could have been avoided if there had been no operator error at all, with such a large percentage of human error-involved accidents, undoubtedly a major portion of them could be either eliminated or diminished in their impact with better equipment operation.

In addition to the obvious threat to the lives and safety of those working in the mines which accidents cause, mine efficiency goes down and operating costs go up as accidents require equipment to be taken out of service for repair. Another large spinoff effect is the inability of the maintenance crew to devote time to preventive maintenance if it is continually tied up in major repair projects involving trucks which have been in accidents.

Prior training of haulage truck operators generally involves the trainee riding along with an experienced operator for a few days after which he is put on his own, possibly with an instructor riding along for a brief period. It is a fact, though, that the majority of accidents of the type described above are caused by operators with less than a year on the job. This alone stands testimony to the fact that practical, increased efficiency through better training would reduce the economic and human costs of accidents.

Prior to the development of the instant invention, similar operator training problems involving equipment other than on or off-road trucks have been met by training and in a lot of instances with the use of simulators. Simulators are widely used in aircraft training, they have also been used or at least developed for training tank operators, submarine operators, and in other applications where equipment is expensive and the fallout from an accident can be disastrous.

While the industry would stand to benefit greatly from training with simulators such as are used for operators of tanks, ships, and aircraft, the costs of such simulators is well beyond the financial capability of all but a handful of mining companies in the United States.

It should further be noted that where such simulators have been developed, the number and kind of variations in machine capabilities and features is relatively small; there are only a few different models of submarines in comparison with haulage trucks which are made by approximately 12 different manufacturers, each offering several models, each of these models having an assortment of options. The value of simulation training comes in its ability to prepare individuals for the operation of their specific machines, not some generalized composite version of a haul truck which does not exist in the real world work place as would have to be created for the purpose of development of affordable simulation. The result of this has been the use of on-machine, on-the-job training, putting the new equipment operators directly into the work place to do their learning because of the high costs of creating for them, an appropriate, beneficial, controlled, simulated experience. The final outcome has been that training addresses only a limited portion of those work place events which could (and do) occur to mining machines and their operators.

However, as has been discussed, there is a definable need for mining machine operators to be able to handle the full range of work place occurrences that they will be exposed to if accidents and injuries are to be reduced and/or prevented, if mining machines are to be maintained in productive modes, and if mine production requirements are to be met. This means that training must provide equipment operators with the knowledge and skills to handle the experiences possible in the work place.

SUMMARY OF THE INVENTION

The present invention fulfills the above stated need, and is part of an overall training program designed to thoroughly verse a truck operator, and in particular a haulage truck operator working in strip mines, in the desired reactions to various machine failures and abnormalities. Training of the operator in responses to equipment failure by actually causing the failure is one part of the overall program of audio visual instruction. The other parts of the program cover other requirements of the training program which do not necessarily relate to equipment failure.

The principal part of the invention is a control unit which in its preferred embodiment is housed in a briefcase-like casing. The casing has an umbilical or connector cable which releasably engages through a multi-pin connection ot the mating portion of the assembly in the haulage truck which is modified to accept the control unit.

The control unit has several functions. Its front panel has several built-in gauges which match the gauges of the actual truck. These gauges will ordinarily each duplicate the reading of the truck gauge, so that, for example, the radiator water temperature gauge on the dash will be duplicated by the water temperature gauge in the control unit.

An instructor, bringing on board one of the control units, connects it to the adapted system of the modified truck and sits with the trainee while he is operating over a training course, or perhaps even going through a day's work in the production cycle. The instructor can see from his control unit what the trainee sees on the dashboard. With the control unit, the instructor has means of causing the indicator gauges to actually indicate an abnormal condition, both on the control unit and on the dashboard of the vehicle. A timer built into the control unit enables the instructor to measure how long it takes the student to notice that an abnormal, potentially dangerous condition has developed. The trainee can also be checked on whether he takes the proper corrective action within critical time constants in some instances once the abnormal condition is detected.

A similar function of the instructor is to cause various alarms of the haulage truck to actuate. The alarms may be visual, audio, or audio visual. By flipping appropriate switches on the control unit, alarms can be made to sound, and again the instructor is able to determine on a timed basis whether the proper recognition and reactions of the trainee are brought into play.

The third and most important function of the control unit is to cause actual equipment malfunction in the haulage truck. There are several operating systems which are "degraded", that is, caused to function below their designed effectiveness. One such system is the hydraulic steering system. By holding a spring-loaded switch at the degrade position, the instructor can cause the vehicle steering to be sluggish and non responsive. This is done by the deliberate introduction of a restriction in the hydraulic lines powering the steering via a signal from the control unit. The loss of steering is never total but it is sufficient to provide the trainee with sensory cues that steering capabilities are failing; he also learns how the machine "feels" with the steering functioning at below normal levels. Equally important, the trainee is afforded the opportunity to practice repeatedly and safely the proper procedure for handling such a failure so as to learn not to panic, to learn what he can do to control the situation and reduce or prevent an accident and/or injury.

Two other operating systems which are similarly degraded are the service brakes, which are degraded by the instructor actuating a switch which reduces pressure in the brake lines, and the retarder, or down-hill dynamic braking system, which is similarly degraded by action of the instructor.

The instructor also has the capability of killing the engine, or propulsion.

What the control unit then does for a haulage truck is in effect make it into a simulator, without the tremendous cost and complexity of an actual simulator. By adapting the truck to be selectively controllable from the control unit, both as to its indicator readings and even more importantly its operating systems, emergencies and abnormalities can be simulated and induced under controlled, safe conditions to develop the operator's skills and knowledge rather than leaving to random chance and human error the "opportunities" to experience and learn how to handle abnormal and emergency conditions (with the attending high probability of accident and/or injury).

DETAILED DESCRIPTION OF THE PREFERRED EMBODIMENT

Figure 3:
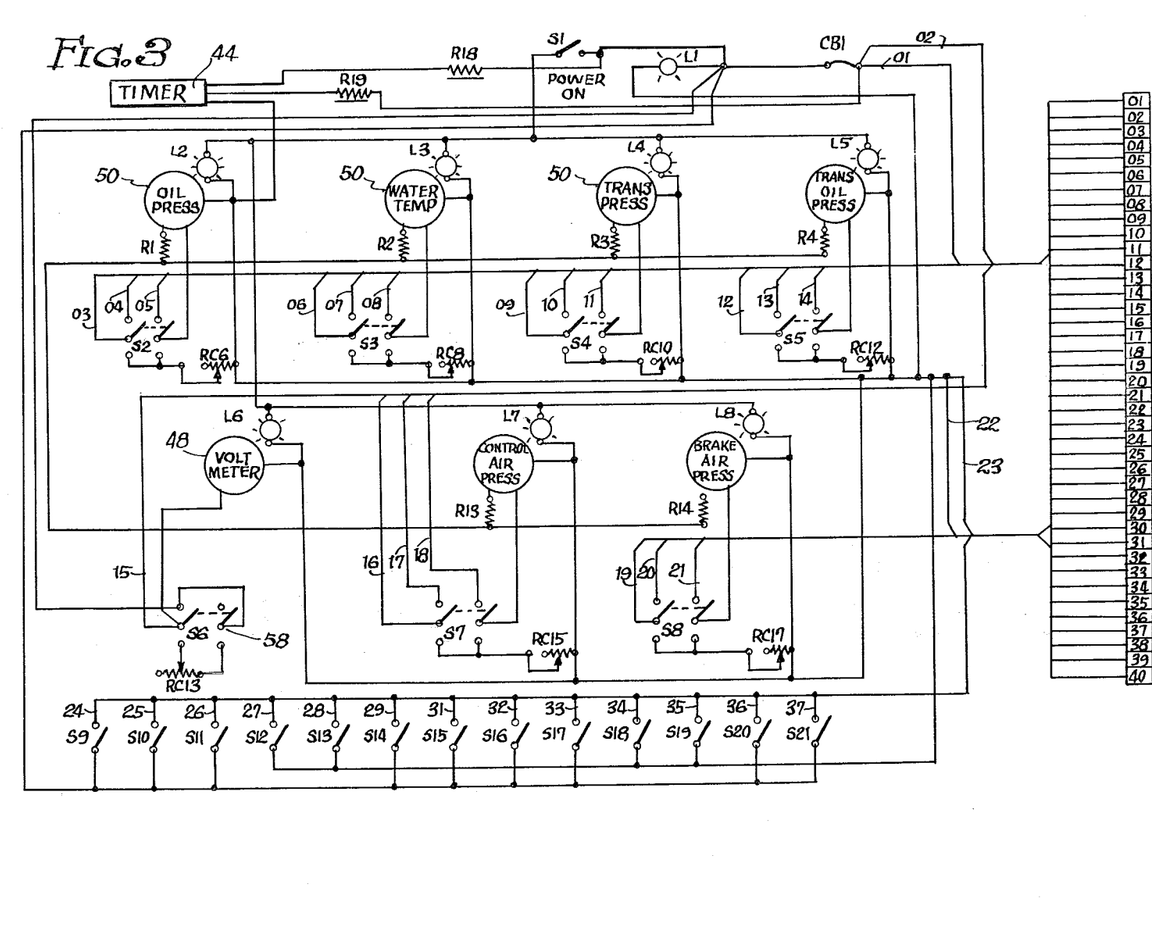
FIG. 3 is a schematic diagram of the control unit.

In order to most clearly describe the invention, the first forty indicator numberals will be assigned to terminals in the connector which correlate with the terminals so numbered on the schematic in FIG. 3 according to the following schedule:

01 (+) Ignition "battery" 24 Vdc
02 (+) Ignition "battery" 24 Vdc
03 Oil press. gauge
04 Oil press, sender (truck)
05 Oil press. sender (OBSAC)

06 Water temp. gauge
07 Water temp. sender (truck)
08 Water temp. sender (OBSAC)
09 Trans/clutch press. gauge
10 Trans/clutch press. sender (truck)

11 Trans/clutch press. sender (OBSAC)
12 Conv/trans. temp. gauge
13 Conv/trans. temp. sender (truck)
14 Conv/trans. temp. sender (OBSAC)
15 Voltmeter 16 Control/main air press. gauge
17 Control main air press. sender (truck)
18 Control/main air press. sender (OBSAC)
19 Brake air press. gauge
20 Brake air press. sender (truck)

21 Brake air press sender (OBSAC)
22 Ground
23 Ground
24 Brake degrade solenoid
25 Retarder degrade solenoid 26 Steering degrade solenoid
27 Low oil press. alarm
28 High Water temp. alarm
29 Parking brake alarm
30 Emergency master breaker alarm 31 Kill engine
32 Low air press. alarm
33 Low steering press. alarm
34 Hydraulic/trans filter alarm
35 Spare 36 Ground fault alarm
37 Propulsion kill
38 Spare
39 Spare
40 Spare The listed functions and the unit described herein pertains to a haulage truck used in strip mines. It will become clear that the same basic approach can be used in many similar types of equipment, and can be used in on-road trucks. Because the unit is used on board the truck, it is referred to by the acronym OBSAC, or On Board Simulation of Abnormal Conditions.

Figures 1, 2:
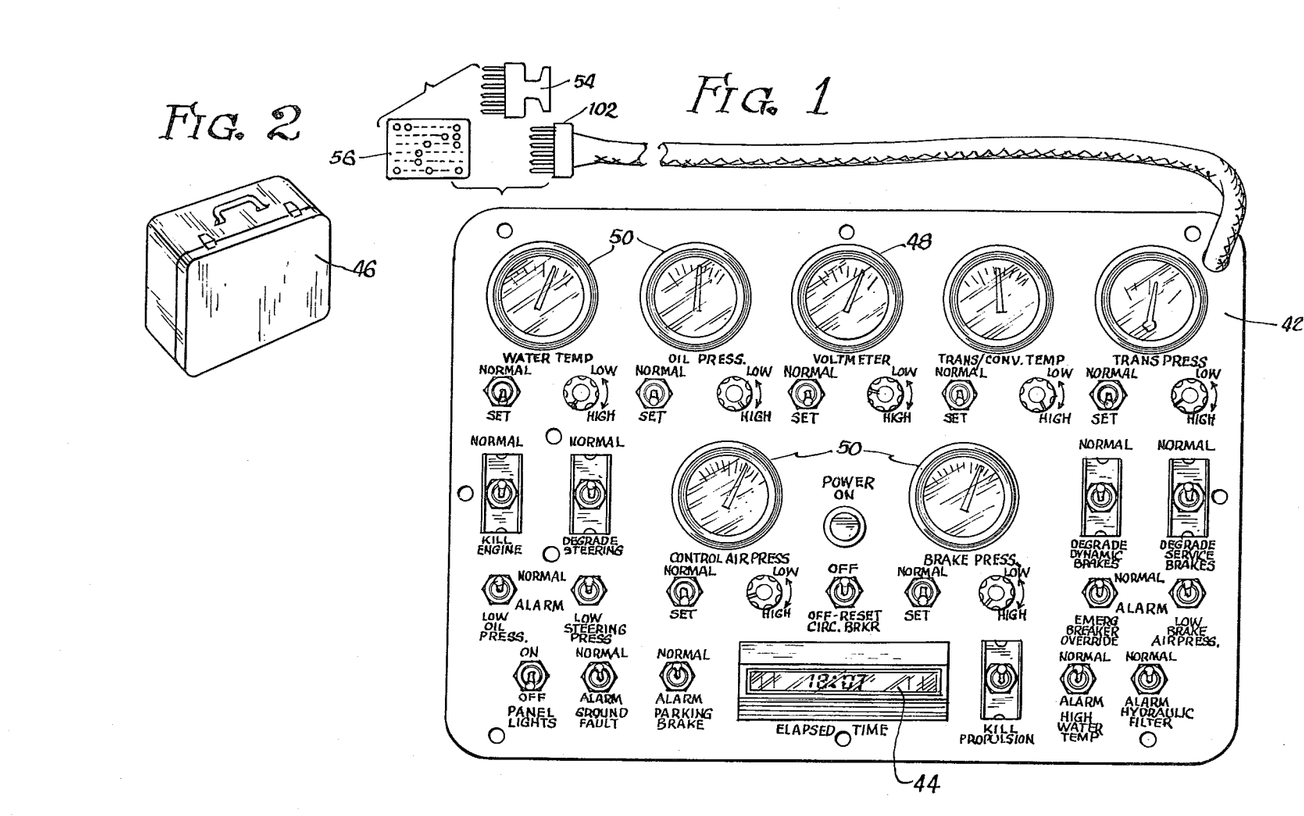
FIG. 1 is a front elevation view of the control unit panel.
FIG. 2 is a perspective of the control unit in its briefcase-like casing.

The OBSAC as shown in FIG. 1 has a front panel 42 which mounts all of the equipment, including a timer 44 which is operable by the instructor at will to time trainee reaction time. The front panel is mounted inside a suitcase-like or briefcase-like casing 46 illustrated in FIG. 2 which both serves to conveniently mount the components and the panel for easy portability, and to protect the apparatus.

The OBSAC can be broken down functionally into three components. First, there is a meter duplication and override mode wherein each meter on the dashboard on the truck is duplicated in the OBSAC control unit and provides the instructor with an indication of the actual truck reading, as well as the opportunity to override the true reading of both meters and cause them to register an abnormal reading. In the second mode, various alarms, audio and visual, can be triggered from the control unit to simulate an emergency condition, and in the third mode the instructor has the capability with the control unit to actually override selected operating systems of the truck to degrade various ones of these systems. These basic modes will be discussed in sequence.

As can be seen in FIG. 1, a series of meters or gauges are built into the front panel of the control unit. These gauges are together indicated by the numeral 50 for simplicity, except the gauge 48 used for the voltmeter which has slightly different circuitry, and the gauges respond to different truck functions as indicated by the legend on the respective gauges. The schematics of all of these gauges is indicated in FIG. 3, and FIG. 6 diagrams a typical one of the meters 50 as it connects to its matching gauge 52 on the truck dashboard.

Figure 6:
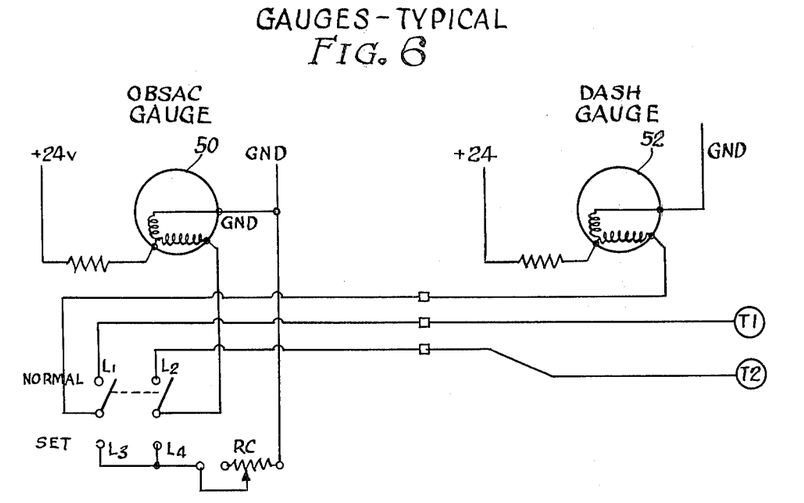
FIG. 6 is a schematic diagram of a typical dual guage arrangement of the OBSAC.

With reference to FIG. 6, a double pole, double throw switch is indicated. This switch is mounted on the front panel of the control unit and could be any of the switches S2 through S8 (except S6). The switch is controlled by the instructor, and in its up position in FIG. 6 meter 52 makes contact through contact L1 with engine sensor or transducer T1, which is ordinarily the temperature or pressure sensor built into the engine. Thus when in the up position, gauge 52 reads normally, and the connection is as though the OBSAC unit were not used, except that the direct connection between meter and transducer has been replaced by a loop which passes through the OBSAC control unit so that the instructor can break this connection.

The meter 50 of the control unit similarly makes contact through contact G2 with transducer T2, which is a duplicate of T1 installed as part of the adaptation of the truck unit for use with the OBSAC. Therefore, gauge 50 reads identically to gauge 52 as they are both driven by identical transducers which transduce identical functional data from the engine or other operating system.

However, by operating switch S, the instructor has the option of flipping the poles of the switch into contact with contacts L3 and L4, which simultaneously control the readings on both gauges 50 and 52 by manipulation of the rheostat control RC. Thus the instructor can not only put the truck gauge into an abnormal condition, but he can also vary the degree of abnormality and the direction, and simultaneously have a duplicate reading on his own meter 50. In a normal instructional setting, of course the trainee does not know the change has been made in the control unit, and the instructor may set the timer 44 to determine trainee response time, and thus establish what the trainee's scan frequency is. In addition to instruction, this also tends to establish the habit in the trainee of periodically reviewing his meter readings to turn up an abnormal condition early.

The circuit of FIG. 6 is typical of all of the gauges 50 indicated in FIG. 3. The switches are numbered S2, S3, S4, etc., and the control rheostats are also separately numbered, but the numbered switch contacts correspond to the contact with the truck gauge, contact with the original equipment transducer, and contact with the added transducer T2 in all instances as can be understood by reference to the number list above. These subcircuits are all the same. Because an interruption must be made between the transducers and the gauges that are on the truck, naturally the connection must be re-made before the truck can operate normally. This is achieved by means of a plug or cap 54 shown in FIG. 1. The plug must be in place in the mating portion 56 defining the truck site of the connector junction whenever the truck is used. Otherwise, clearly none of the truck meters would work.

The volt meter 48, shown in FIG. 3, operates slightly differently than the other meters. In its up position, voltmeter 48 taps into the voltage on the positive side of the voltmeter in the truck, not shown. When the switch S6 is thrown into the down position, volt meter 48 as well as the truck volt meter, coming in on contact 15, connect with the sliding contact of the rheostat control RC 13 whose variable voltage drop at the sliding contact is powered by power line 58, supplied to the rheostat through the other pole of the switch S6. Both meters are thus applied with the voltage either of the truck electrical system, or a reduced voltage which is dropped by reducing the resistance in the control rheostat RC13.

The particular meters shown, of course, pertain to a haulage truck that is used as an example. Other types of rigs, as well as other haulage trucks made by different manufacturers, may have more, less, or different gauges and meters than those shown, but the principles remain the same.

Turning toward the second mode of operation, the instructor has at his disposal a series of systems alarms on board the truck which he can actuate with switches S12 through S15 and S17 through S20. The alarms that are actuated are indicated in the numeral list corresponding to the contacts of the switches indicated in the schematic. The switches provide a means of duplicating the effect of the truck's own sensor, to simulate an emergency condition and sound the alarm.

The third basic functional mode of the unit is the actual interference and degrading of operating systems of the truck. Although subject to some variation, the following lists the major degrading functions of the OBSAC:

1. Degrading the service brakes;
2. Degrading the hydraulic power steering;
3. Degrading the retarder system;
4. Killing the engine; and
5. Killing propulsion.

Figure 4:
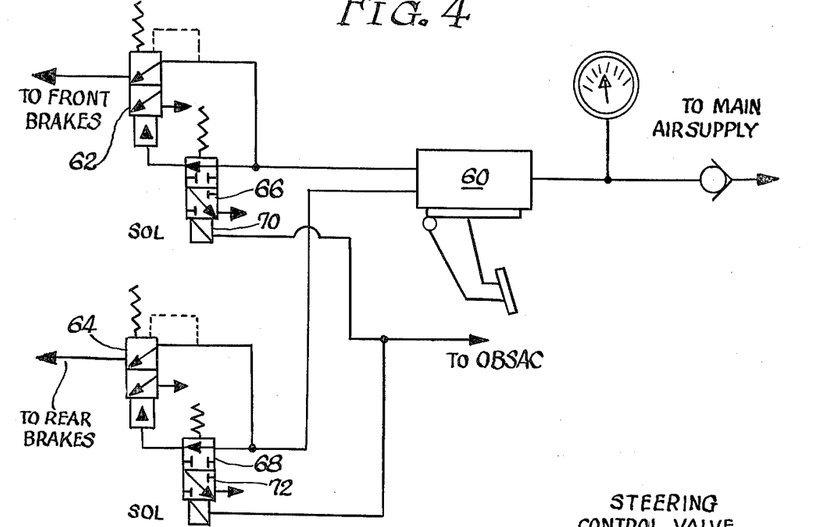
FIG. 4 is a pneumatic diagram of the service braking system of the OBSAC modifications.

For a truck with premature braking the first degrading function, degrading the service brakes, requires a modification to the truck pneumatic system as shown in FIG. 4. The modified pneumatic brake system includes a brake pedal-treadle valve 60 which, when depressed, actuates the brake line valves 62 and 64 which are shown in their passive position to deliver full pneumatic pressure to the rest of the brake system. When the brake pedal is released, valves vent the pressure in the brake line.

The OBSAC modification also utilizes a pair of pneumatic valves 66 and 68 which are inserted in the lower supply lines to the brake valves. These valves, shown in the inactive mode in FIG. 4, can be shifted by the solenoids 70 and 72 which has the effect of moving the valve from an unobstructed position in its passive mode to a position in which pneumatic pressure to pilot valves 62 and 64 into braking position is cut off. When this is done, about 50% of the braking pressure from the treadle valve 60 is delivered to the brakes effectively degrading the brakes corresponding to a mechanical malfunction that might occur requiring corrective action by the trainee.

Turning to FIG. 3, switch S9, connected to brake degrade line 24, also indicated in FIG. 1, enables the instructor to effect the brake degrading discussed above. The system has two safety features. First, the switch S9 is spring loaded into its open position, as are all the degrade switches. Second, the solenoid-operated valves 66 and 68 are also spring-loaded into their passive modes so that a failure of power at the OBSAC or some incapacitation of the instructor, causes the brakes to return to full power condition. Even further, the emergency braking system of the truck is not affected by the OBSAC modification, and in fact it is the purpose of degrading the brakes to familiarize the trainee with the fact that the emergency system exists, and how to use it.

Figure 5:
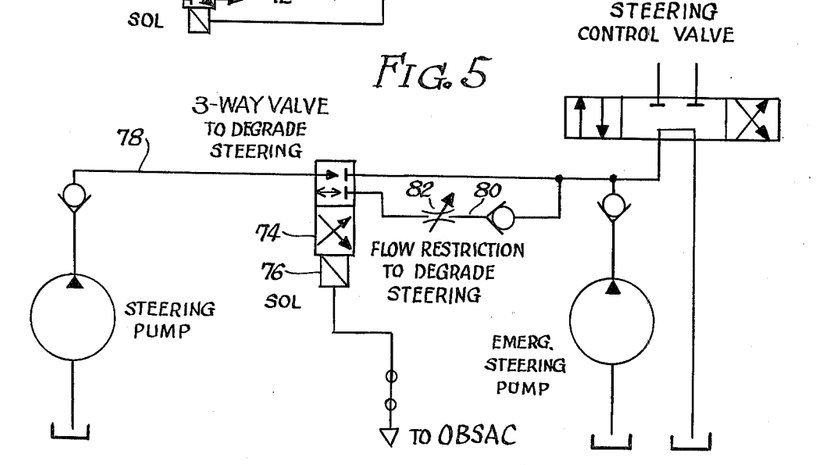
FIG. 5 is a hydraulic diagram of the hydraulic power steering system with OBSAC modifications.

The second operational system which can be degraded is the hydraulic power steering system. The schematic of this system is shown in FIG. 5 which shows the major components named on the drawing. The steering pump provides hydraulic pressure to the steering control valve under ordinary conditions, and is backed up by the emergency steering pump. The OBSAC modification includes the insertion of a three-way valve to degrade steering, indicated at 74, and operated by solenoid 76 remotely through switch S11 operative through circuit connection 26.

FIG. 5 illustrates the valve 74 in its passive mode in which hydraulic fluid is freely passed through the fluid line 78. A secondary line 80 is added in parallel to the main line as part of the OBSAC modification, and this line contains an adjustable restriction 82. Actuation of the valve causes the fluid to flow through line 80 and through the restriction. The resulting decreased oil flow reduces capability beneath the level which is optimal for maximum steering.

Figure 7:
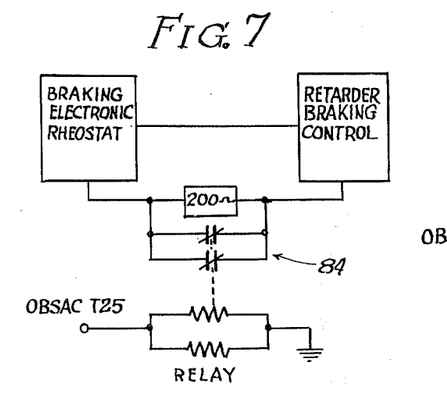
FIG. 7 illustrates the retarder degrading system implemented in an electric retarder.

A third degrading function involves the retarder brake system, which is used for normal braking. Two types of retarders are used. In this type of truck in which a diesel engine operates a generator to power electric motors at each of the respective wheels or wheel groups, the retarder utilizes these wheel motors as wheel driven generators. The current flows through a resistive heat dissipation grid which dissipates the energy extracted from the truck as heat, thus providing a recharging effect on the truck. To degrade this type of retarder, as shown in FIG. 7, a relay operated by OBSAC switch S10 operating through circuit line 25 opens two of normally closed contacts 84 to put a 200 OHM resistor in the line between the retarder control and the electronic braking rheostat, thus reducing the current and subsequent braking effort.

Figure 8:
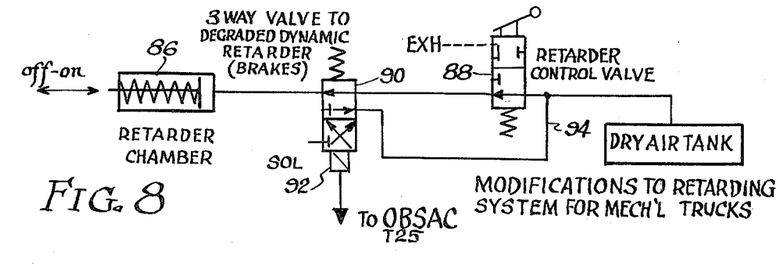
FIG. 8 illustrates a retarder degrading system on a hydraulic retarder.

The other type of retarder is illustrated in FIG. 8. This system pertains to a diesel which is a mechanical drive, and does not use electric motors for drive purposes. In this type of system the retarder is hydraulic rather than electrical and in most cases is pneumatically controlled. As shown in FIG. 8, a pneumatic retarder is ineffective when the piston in cylinder 86 is moved to the left. In order to apply the retarder a manual control valve 88 is operative from its spring-loaded neutral position shown in FIG. 8 downwardly to a position in which it vents the pneumatic pressure from the line in the cylinder to the atmosphere. This causes the piston in the cylinder 86 to move to the right and actuate the retarder. Thus a failure in the pneumatic system will automatically cause the retarder to come into play as a safety measure.

The OBSAC modification incorporates another valve 90, spring-loaded in neutral position as shown and actuated by solenoid 92 to divert the pneumatic path through a shunt line 94 around the retarder control valve 88 so that operation of this valve by the operator is totally or partially ineffectual to bring the retarder into play. The same switch S10 is indicated as the retarder degrade switch for this type of retarder system as well as the electrical type.

Figure 9:
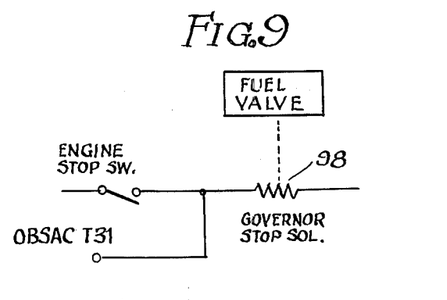
FIG. 9 illustrates the engine kill schematic.

Two further degrade functions of the OBSAC control unit are the engine kill function and the propulsion kill function. FIG. 9 illustrates an OBSAC adaptation wherein switch S5 bypasses the existing engine stop switch 96 to actuate fuel shut-off solenoid 98 to stop the engine.

Figure 10:
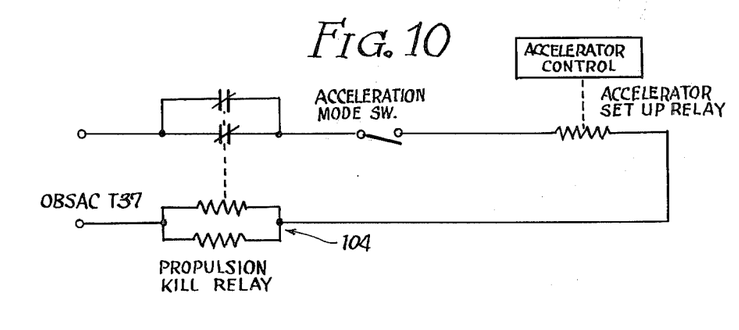
FIG. 10 schematically illustrates the propulsion kill circuit.

As shown in the schematic of FIG. 10, for a diesel powered electrical drive system, switch S16 is used to energize relays 104 which prevent enabling of the acceleration set-up relay thereby disabling the propulsion system. This system is not shown in the drawings as it is simple to visualize.

The OBSAC control unit which is mounted in the suitcasing 46 connects to the modifications in the truck through a connecting cable 100 which terminates in a multi-pin plug 102. This plug mates with the plug 56, and as mentioned earlier, when not in place is replaced by the dummy plug 54 which makes all appropriate connections among the terminals of the plug 56 to permit the truck to operate normally.

As discussed, it is the means and methods of actually interrupting indicator gauge readings, alarm systems, and operating systems of the truck or other piece of equipment, on a controlled basis, that comprises the essence of the invention. Other items of equipment, both mobile type trucking equipment and others, may be benefitted by use of a training system involving an OBSAC unit modified to accommdate its particular operating systems, indicator gauges and alarms. It is anticipated, however, that the implementation of a system using the OBSAC unit, in broad applications, will make a substantial impact on the safety task training field, particularly in heavy equipment, and will result in a substantial saving of lives and minimization of equipment damage and loss.

While I have described the preferred embodiment of the invention, other embodiments may be devised and different uses may be achieved without departing from the spirit and scope of the appended claims.

What is claimed is:

1. An equipment operator training aid for use with a piece of equipment having operation systems and function indicators, said training aid comprising:

(a) a control unit which is portable and releasable and can be carried away from a particular piece of equipment on which it is being used after use;

(b) adapter means adapting at least one ofr said indicators to be overridden and controlled by an external input;

(c) a converter cable having a separable junction between said control unit and said adapter means, whereby an instructor operating said control unit can cause an indicator so adapted to indicate an abnormal condition to check trainee cue recognition and response; and, (d) including a terminal plug for use with the portion of said junction connected to said adaptor means whereby circuits can be opened in the electrical circuit of said equipment to divert circuit control to said control box, and appropriate connections can be made by said plug when said control box is not in use to permit normal operation of said equipment when not being used in training.

2. An equipment operator training aid for use with a piece of equipment having operating systems and function indicators, said training aid comprising:

(a) a control aid;

(b) adapter means adapting a plurality of said indicators to be overridden and controlled by an external input;

(c) means for operatively connecting said control unit and said adapter means, whereby an instructor operating said control unit can cause an indicator so adapted to indicate an abnormal condition to check trainee cue recognition and response;

(d) said plurality of indicators are provided with plural respective adapter and connecting means and including respective plural individual controls in said control unit whereby said instructor can selectably alter one or more of said indicators concurrently or sequentially to check a variety of trainee recognition skills and responses; and (e) said indicators including equipment gauges and further including matching gauges in said control unti wired through said connector means to said equipment gauges such that readings on a respective equipment gauge and matching gauge are the same, permitting an instructor to determine the equipment gauge reading without reference to the equipment instrument panel.

3. An equipment operator training aid for use with a piece of equipment having operating systems and function indicators, said training aid comprising:

(a) a control unit including means to temporarily degrade at least one of said operating systems;

(b) adapter means adapting at least one of said indicators to be overridden and controlled by an external input;

(c) means for operatively connecting said control unit and said adapter means, whereby an instructor operating said control unit can cause an indicator so adapted to indicate an abnormal condition to check trainee cue recognition and response; and (d) said operating systems include at least one fluid system depending on fluid flow to function properly, said at least one fluid system is adapted with a fluid valve capable of selectably interfering with said fluid flow, and said means to temporarily degrade actuates said valve.

4. An equipment operator training aid for use with a piece of equipment having operating systems wherein an instructor can interface in the operation of said systems to check trainee cue recognition and response, said training aid comprising:

(a) a control unit;

(b) adapter means adapting at least one of said systems to be temporarily modified by an external input;

(c) connector means operatively connecting said control unit to said adapter means, whereby an instructor operating said control unit can temporarily modify said at least one system to check trainee recognition of and response to said modified condition; and, (d) said at least one system comprising a hydraulically operated steering system dependent on a flow of pressurized hydraulic fluid through a supply line to operate, and said adapter means comprises a restricted shunt line paralleling a portion of said supply line and a solenoid operated hydraulic valve operated by a control switch in said control unit to divert hydraulic fluid through said shunt line to degrade steering.

5. An equipment operator training aid for use with a piece of equipment having operating systems wherein an instructor can interface in the operation of said systems to check trainee cue recognition and response, said training aid comprising:

(a) a control unit;

(b) adapter means adapting at least one of said systems to be temporarily modified by an external input;

(c) connector means operatively connecting said control unit to said adapter means, whereby an instructor operating said control unit can temporarily modify said at least one system to check trainee recognition of and response to said modified condition; and, (d) said at least one system comprising a pneumatic brake system, and said adapter comprising a restriction valve operative to reduce pneumatic pressure in the brake actuator lines to degrade braking.

6. An equipment operator training aid for use with a piece of equipment having operating systems wherein an instructor can interface in the operation of said systems to check trainee cue recognition and response, said training aid comprising (a) a control unit;

(b) adapter means adapting at least one of said systems to being temporarily modified by an external input;

(c) connector means operatively connecting said control unit to said adapter means, whereby an instructor operating said control unit can temporarily modify said at least one system to check trainee recognition of and response to said modified condition; and (d) said at least one system comprising a dynamic retarder system utilizing an electric grid resistive heat dissipative system having a solenoid-actuated relay actuating a retarder control circuit and said adapter comprises a resister selectably insertable in said retarder control circuit to reduce the current through the said grid and therefore the energy dissipation thereof to degrade retarder efficiency.

7. An equipment operator training aid for use with a piece of equipment having operating systems wherein an instructor can interface in the operation of said systems to check trainee cue recognition and response, said training aid comprising:
- (a) a control unit;
- (b) adapter means adapting at least one of said systems to be temporarily modified by an external input;
- (c) connector means operatively connecting said control unit to said adapter means, whereby an instructor operating said control unit can temporarily modify said at least one system to check trainee recognition of and response to said modified condition; and,
- (d) said at least one system comprising a pneumatically actuated hydraulic retarder system and said adapter comprising a valve selectably positionable to interfere with the operation of said pneumatic system to degrade said retarder system.

8. An equipment operator training aid for use with a piece of equipment having operating systems wherein an instructor can interface in the operation of said systems to check trainee cue recognition and response, said training aid comprising:
- (a) a control unit;
- (b) adapter means adapting at least one of said systems to being temporarily modified by an external input;
- (c) connector means operatively connecting said control unit to said adapter means, whereby an instructor operating said control unit can temporarily modify said at least one system to check trainee recognition of and response to said modified condition; and
- (d) said piece of equipment utilizing a diesel engine, a generator driven by said diesel engine, and a plurality of electric motors providing propulsion for said piece of equipment driven by said generator, and said at least one system comprises the electric control circuitry between said generator and motors, and said adapter comprises relays activatable to preclude operation of said electric motors and therefore kill propulsion of said unit.

9. A method of training an equipment operator trainee while operating equipment having a hydraulic steering system by utilyzing a control unit operatively connected to and capable of interfering with said hydraulic steering system, including the following steps:
- (a) with the trainee in the operating position in the equipment, putting an instructor with the control unit in the equipment;
- (b) initiating and following through with equipment operation over an interval by the trainee; and,
- (c) during said interval, degrading the hydraulic steering system by switching a valve in the hydraulic lines of said hydraulic steering system to divert system hydraulic fluid through a restricted passageway to reduce flow of hydraulic fluid to the hydraulic steering system, said valve being operated from said control unit by the instructor, whereby trainee responses can be judged and the action taken by the trainee responsive to said interference can be observed and corrected with appropriate instruction by the instructor if necessary.

10. A method of training an equipment operator trainee while operating equipment having a pneumatic brake system by utilizing a control unit operatively connected to and capable of interfering with said pneumatic brake system, including the following steps:
- (a) with the trainee in the operating position in the equipment, putting an instructor with the control unit in the equipment;
- (b) initiating and following through with equipment operation over an interval by the trainee; and,
- (c) during said interval, degrading the pneumatic brake system by bleeding pneumatic pressure from the pneumatic lines from a control the control unit operated by the instructor whereby trainee responses can be judged and the action taken by the trainee responsive to said interference can be observed and corrected with appropriate instruction by the instructor if necessary.

* * * * *